Aug. 9, 1966

D. B. POWELL 3,265,832

ELECTRICAL CONTROL DEVICE WITH ADJUSTABLE
CALIBRATION LOCKING MEANS

Filed Jan. 16, 1964

INVENTOR.
DAVID B. POWELL
BY Robert F. Carey
ATTORNEY

United States Patent Office 3,265,832
Patented August 9, 1966

3,265,832
ELECTRICAL CONTROL DEVICE WITH ADJUSTABLE CALIBRATION LOCKING MEANS
David B. Powell, Bristol, Conn., assignor to General Electric Company, a corporation of New York
Filed Jan. 16, 1964, Ser. No. 338,081
4 Claims. (Cl. 200—116)

My invention relates to electrical control devices including adjustable calibration means and more particularly, to such devices including adjustable calibration means which may be readily locked against accidental or unauthorized alteration.

Many electric control devices, such as electric circuit breakers, are constructed in such a manner that it is necessary to adjust the setting or "calibration" after assembly in order that the circuit breaker will operate under the exact conditions intended. This adjustment, or calibration, is best accomplished if it is done after the circuit breaker mechanism is completely assembled and inserted into the circuit breaker casing. Moreover, it is desirable that the means utilized to calibrate the circuit breaker mechanism not be susceptible of any unauthorized movement by the user after its initial or factory adjustment.

It is an object of my invention to provide a circuit breaker having calibrating means which is accessible for adjustment from outside its closed casing and which can be quickly and positively sealed in adjusted position after an initial calibration in order to prevent unauthorized movement thereof.

Further objects and advantages of my invention will become apparent as the following description proceeds and the features of novelty which characterize my invention will be pointed out with particularity in the claims annexed to and forming a part of this specification.

In accordance with the invention in one form, an electric control device is provided, including an insulating casing having an adjustable member therein whose angular position is to be adjusted to set the calibration of the device. The adjustable member is carried by a shaft having a portion thereof projecting through a hole in the insulating casing. At least the portion of the shaft projecting through the hole is made of thermoplastic material, and the hole has a non-circular outline at the outer side of the casing.

In practice, the adjustable member is set to a desired position by rotating the shaft by means of the part projecting out of the casing. Thereafter, heat and pressure are applied to the outer, thermoplastic, portion of the shaft, causing it to soften and flow so as to substantially completely fill the non-circular outer portion of the hole, thus effectively preventing further rotation of the shaft.

The plastic deformation of the shaft is preferably such that substantially none of the shaft projects from the casing surface and such that no gripping means, such as a slot or recess, remains.

For a better understanding of my invention, reference may be had to the accompanying drawings in which.

Figure 1:
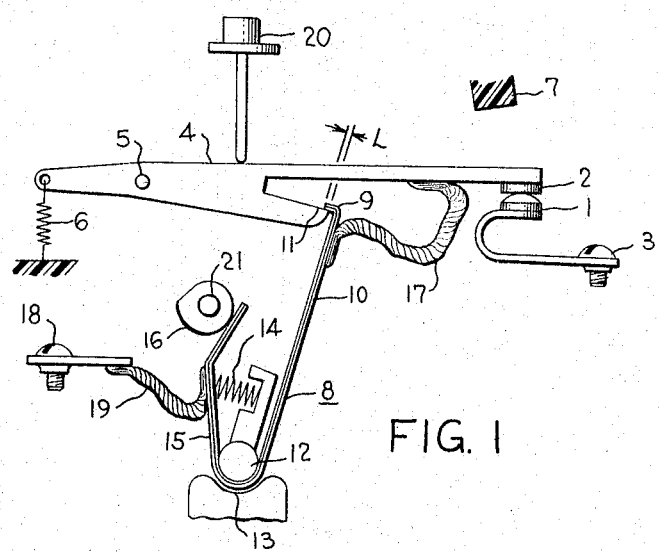
FIGURE 1 is an elevational detailed view of a portion of a thermo-responsive electric circuit breaker incorporating one form of my adjustable calibrating means.

As may be seen from FIGURE 1, a circuit breaker is provided including a stationary contact 1 and a movable contact 2. The stationary contact is electrically connected to a screw-type line terminal 3. The movable contact 2 is mounted on one end of a pivoted arm 4, the arm 4 being pivoted at 5. The pivoted arm 4 is biased to open position by a tension spring 6 which is connected to the arm 4 at the opposite end from the movable contact 2. Movement of the pivoted arm to the open position is limited by engagement with a stop member 7.

The pivoted arm 4 is latched in its closed position by means of a U-shaped bimetallic member 8. The bimetallic member includes a tang 9 which is formed at the end of one arm 10 of the bimetallic member and engages a hook 11 provided in one side of the pivoted arm 4. The bimetallic member is pivotally mounted between an abutment 12 formed integrally with the casing and recess 13 formed in one wall of the casing. A compression spring 14 is mounted between the other arm 15 of bimetallic member 8 and the abutment 12 for biasing the arm 15 into contact with an adjustment cam 16 and for causing engagement of tang 9 with hook 11. The arm 10 of the bimetallic member is electrically connected to the pivoted arm 4 adjacent the movable contact 2 by means of an electrical lead 17 and the arm 15 is electrically connected to screw-type load terminal 18 by means of a second lead 19.

When the circuit breaker is closed, that is when the movable contact 2 is in engagement with the stationary contact 1, current flows through the bimetallic member 8. An overcurrent condition causes the bimetal to heat and deform so as to move the tang 9 out of engagement with the hook 11 and unlatch the pivoted arm 4. The tension spring 6 then causes the pivoted arm to move counterclockwise and open the circuit breaker by separating the stationary contact 1 and the movable contact 2. A push-button reset member 20, positioned adjacent the pivoted arm 4, is depressed in order to move the pivoted arm clockwise to the circuit breaker closed position. When the pivoted arm reaches the closed position the tang 9 again engages the hook 11 to latch the circuit breaker closed.

In order to ensure that the bimetallic member 8 operates to open the circuit breaker for a given over-current condition, the overlap (L) between the tang 9 and the hook 11 must be adjusted. For this purpose, a cam 16 is provided which is rotatably supported by means of a shaft 21, and is arranged to move the arm 15 as the cam is rotated and thereby alter the overlap between the tang 9 and hook 11. This adjustment of the overlap alters the current conditions under which the bimetalic member 8 will deform sufficiently to separate the tang 9 from the hook 11 and allow the pivoted arm 4 to move in a counterclockwise direction to break the contact between the stationary contact 1 and movable contact 2. While the cam 16 is preferably supported by the shaft 21 by being formed integrally with the shaft, it will be understood that the cam may be formed separately and then mounted on the shaft in any conventional manner.

Figure 2:
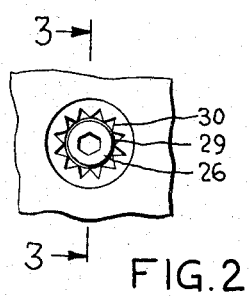
FIGURE 2 is a partial elevational view of a circuit breaker illustrating the mounting of the rotatable shaft in the hole in the side of the casing.
Figure 3:
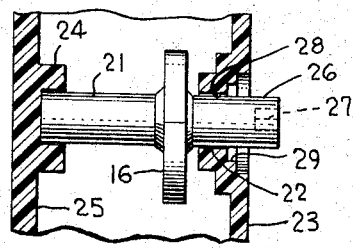
FIGURE 3 is a cross-sectional view taken along lines 3—3 of FIGURE 2 with the operating mechanism of the circuit breaker removed for purposes of illustration.
Figure 4:
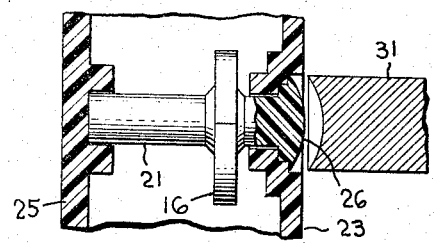
FIGURE 4 is an elevational view similar to FIGURE 3, but illustrating the configuration of the rotatable shaft after the application of a heated deforming tool.

FIGURES 2, 3, and 4 illustrate the mounting arrangement of the cam 16. The shaft 21 extends through a hole 22 in one wall 23 of the circuit breaker casing and is received in a recess 24 formed in an opposite wall 25 of the casing. The outer portion 26 of the shaft 21 is made of thermoplastic material and is provided with a recess or slot 27 to receive an adjusting tool for rotating the shaft 21 and cam 16 in order to calibrate the circuit breaker mechanism. The hole 22 in the wall 23 has an inner portion 28 of predetermined diameter and an outer counterbore portion 29 which is of a non-circular shape, having a larger transverse dimension than the inner portion 28. The counterbore portion preferably takes the form of a serrated wall 30 (best seen in FIGURE 2).

After the circuit breaker including the cam 16 and shaft 21 is assembled, a suitable tool (not shown) is inserted in the slot 27 and the cam is adjusted to provide proper positioning of the bimetallic member 8. After the adjustment, a heated tool 31 is applied to the outer end 26 of the shaft 21 to cause the thermoplastic material to flow, thereby filling the counterbore portion 29 of the hole, including the serrations in the wall 30. The tool is removed and the thermoplastic material hardens upon cooling. This fixes the cam in the calibration portion against accidental movement by reason of the interlocking action of the hardened plastic material of the shaft with the serrations in the wall 30. It also discourages any attempts by unauthorized personnel to change the setting since there is no means for readily gripping the shaft.

A satisfactory group of thermoplastic materials for use in the shaft 21 are the polycarbonates sold under the trademark "Lexan." However, other thermoplastic materials would also be satisfactory. In the preferred form the cam 16 is formed integrally with the shaft 21; however, if desired, the cam and shaft may be formed separately and the cam then mounted on the shaft in any conventional manner.

Figure 5:
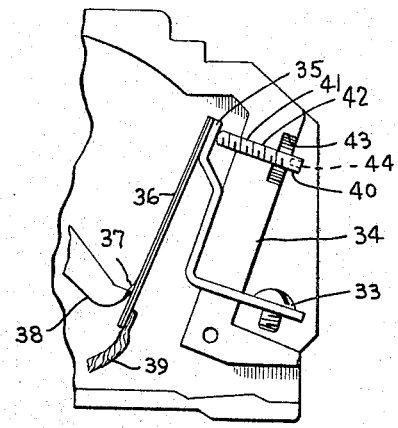
FIGURE 5 is a detailed elevational view of a thermo-responsive electric circuit breaker incorporating a modified form of my invention.

FIGURE 5 illustrates another embodiment of this invention in which the calibrating means comprises a thermoplastic screw. In this embodiment the line terminal 33 extends through the circuit breaker casing 34 and is provided with an arm 35 which bears against one end of a bimetallic member 36. The opposite end of the bimetallic member 36 includes an ear 37 which engages a latch 38. An electric lead 39 connects the bimetallic member 36 to a load terminal (not shown). The circuit breaker is calibrated by means of a thermoplastic screw 40 which extends through a hole 41 in the casing 34 and bears against the arm 35. The hole 41 includes an inner threaded portion 42 and an outer non-circular counterbore portion 43 having a larger transverse dimension than the inner portion 42. The screw 40 includes a slot of recess in its outer end which receives a suitable tool (not shown) to rotate the screw and thereby move the arm 35 and bimetallic member 36, thus altering the tension on the bimetallic member 36 and thereby determining the over-current condition under which the bimetallic member will deform sufficiently to open the circuit breaker. After the circuit breaker mechanism has been calibrated, a heated tool (similar to that shown at 31 in FIGURE 4) is brought to bear against the outer end of the screw 40, causing the thermoplastic material to flow and fill the counterbore portion 43 of the hole 41 and slot 44 in the screw 40. This precludes any subsequent accidental or unauthorized movement of the screw.

Modifications of this invention will occur to those skilled in the art and it is desired to be understood, therefore that this invention is not to be limited to the particular arrangements disclosed but that the appended claims are meant to cover all modifications which are within the spirit and scope of this invention.

What I claim as new and desire to secure by Letters Patent of the United States is:

1. In an electric circuit breaker:
(a) a casing having a hole therein, said hole having an inner portion of a predetermined transverse dimension, and an outer, non-circular portion having a larger transverse dimension than said predetermined dimension of said inner portion;
(b) a cam mounted in said casing for calibrating said circuit breaker;
(c) a rotatable shaft supporting said cam for adjustment thereof;
(d) said shaft extending through said hole and including an outer portion accessible from outside said casing, said outer portion of said shaft being of lesser diameter than said larger transverse dimension of said outer portion of said hole;
(e) at least said outer portion of said shaft being composed of a thermoplastic material whereby the application of heat to said shaft causes said outer portion of said shaft to flow and fill said outer portion of said hole to prevent rotation of said shaft and said cam.

2. In an electric circuit breaker:
(a) a casing with a hole therein having an inner portion of a predetermined transverse dimension, and an outer, non-circular portion having a larger transverse dimension than said predetermined dimension of said inner portion;
(b) a cam mounted in said casing for calibrating said circuit breaker;
(c) a rotatable shaft formed integrally with said cam for adjustment thereof;
(d) said shaft extending through said hole and including an outer portion accessible from outside said casing, said outer portion of said shaft being of lesser diameter than said larger transverse dimension of said outer portion of said hole;
(e) at least said outer portion of said shaft being composed of a thermoplastic material whereby the application of heat to said shaft causes said outer portion of said shaft to flow and fill said outer portion of said hole to prevent rotation of said shaft and said cam.

3. In an electric circuit breaker:
(a) a casing having a hole therein, said hole having an inner screw-threaded portion of predetermined transverse dimension, and an outer, non-circular portion having a larger transverse dimension than said predetermined diameter of said inner portion;
(b) a screw threadedly received in said inner portion of said hole for calibrating said circuit breaker, said screw extending through said hole and including an outer portion accessible from outside said casing, said outer portion of said screw being of lesser diameter than said larger transverse dimension of said outer portion of said hole;
(c) at least said outer portion of said screw being composed of a thermoplastic material whereby the application of heat causes said outer portion of said screw to flow to fill said outer portion of said hole to prevent rotation of said screw.

4. An electric circuit breaker comprising:
(a) a casing with a hole therein, said hole having an inner portion of a predetermined transverse dimension, and an outer, non-circular portion having a larger transverse dimension than said predetermined dimension of said inner portion;
(b) a pivoted arm mounted in said casing for opening and closing said circuit breaker;
(c) a bimetalic member mounted in said casing and overlapping a portion of said arm to latch said arm in a circuit closed position, said bimetallic member being deformable upon a predetermined overcurrent condition to release said arm for movement to its open position;
(d) a cam mounted in said casing and bearing against said bimetallic member for moving said bimetallic member to alter the amount of overlap between said bimetallic member and said portion of said pivoted arm for calibrating said circuit breaker;
(e) a rotatable shaft formed integrally with said cam for adjustment thereof, said shaft including an inner end rotatably seated in a recess in a wall of said casing opposite said hole;
(f) said shaft extending through said hole and including an outer portion accessible from outside said casing, said outer portion of said shaft being of lesser diameter than said larger transverse dimension of said outer portion of said hole;

(g) at least said outer portion of said shaft being composed of a thermoplastic material whereby the application of heat to said shaft causes said outer portion of said shaft to flow and fill said outer portion of said hole to prevent rotation of said shaft and said cam.

References Cited by the Examiner

UNITED STATES PATENTS

| 896,433 | 8/1908 | Burns | 29—156.5 |
|---|---|---|---|
| 2,120,548 | 6/1938 | Collier | 264—249 |
| 2,536,944 | 1/1951 | Kirkby | 200—115.5 |
| 2,686,241 | 8/1954 | Straub et al. | 200—116 |
| 2,885,105 | 5/1959 | Heyl et al. | 264—249 X |
| 3,093,526 | 6/1963 | Price et al. | 264—249 X |
| 3,171,919 | 3/1965 | Hammerly | 200—116 |

OTHER REFERENCES

Mechanical Engineer's Handbook, 6th Ed. N.Y., McGraw-Hill, 1958, pp. 8–31.

References Cited by the Applicant

UNITED STATES PATENTS

| 2,059,867 | 11/1936 | Hinds. |
|---|---|---|
| 2,318,950 | 5/1943 | Larmour. |
| 2,573,307 | 10/1951 | Casey. |
| 2,607,446 | 8/1952 | Rosan. |
| 2,776,349 | 1/1957 | Thomas. |

BERNARD A. GILHEANY, *Primary Examiner.*

H. B. GILSON, *Assistant Examiner.*